US008773818B2

(12) United States Patent
Taguchi et al.

(10) Patent No.: US 8,773,818 B2
(45) Date of Patent: Jul. 8, 2014

(54) MAGNETIC RECORDING HEAD CONFIGURED TO REDUCE THE DEGRADATION OF RECORDED SIGNALS AND DISK DEVICE INCLUDING THE SAME

(75) Inventors: Tomoko Taguchi, Tokyo (JP); Takuya Matsumoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/607,048

(22) Filed: Sep. 7, 2012

(65) Prior Publication Data
US 2013/0271869 A1 Oct. 17, 2013

(30) Foreign Application Priority Data

Apr. 12, 2012 (JP) ................ P2012-091317

(51) Int. Cl.
*G11B 5/127* (2006.01)
(52) U.S. Cl.
USPC .................................................. 360/125.3
(58) Field of Classification Search
CPC ...................................................... G11B 5/127
USPC ........ 360/319, 123.12, 125.16, 125.17, 125.3
See application file for complete search history.

(56) References Cited

U.S. PATENT DOCUMENTS

| 7,561,379 | B2 * | 7/2009 | Li et al. ..................... 360/125.24 |
| 7,920,357 | B2 | 4/2011 | Satu et al. |
| 8,139,322 | B2 * | 3/2012 | Yamada et al. ............ 360/125.3 |
| 8,154,825 | B2 * | 4/2012 | Takashita et al. ........ 360/125.71 |
| 8,159,781 | B2 * | 4/2012 | Taguchi et al. ............ 360/125.3 |
| 8,238,058 | B2 * | 8/2012 | Shimizu et al. .......... 360/125.02 |
| 8,264,799 | B2 * | 9/2012 | Akiyama et al. ............ 360/324.1 |
| 8,363,355 | B2 * | 1/2013 | Mochizuki et al. ........ 360/125.3 |
| 8,467,148 | B2 * | 6/2013 | Iwasaki et al. ................ 360/110 |
| 2012/0262821 | A1 * | 10/2012 | Taguchi et al. ............ 360/99.08 |
| 2012/0268844 | A1 | 10/2012 | Yamada et al. |
| 2012/0275060 | A1 * | 11/2012 | Shimizu et al. ............... 360/110 |

FOREIGN PATENT DOCUMENTS

| JP | 04-271003 | 9/1992 |
| JP | 2011-141934 | 7/2011 |

* cited by examiner

*Primary Examiner* — Angel Castro
(74) *Attorney, Agent, or Firm* — Patterson + Sheridan LLP

(57) ABSTRACT

A magnetic recording head includes a main magnetic pole generating a recording magnetic field, a trailing shield, a recording coil generating a magnetic field and a high frequency oscillator. The trailing shield includes a magnetic region including a gap side end surface facing a write gap and a nonmagnetic film arranged in the vicinity of the write gap in the trailing shield, and within a plane including track width direction centers of the main magnetic pole and the high frequency oscillator and being perpendicular to a recording layer of a recording medium, a film thickness of the nonmagnetic film along a track moving direction is substantially equivalent to or more than a half of a distance from the gap side end surface to the nonmagnetic film.

13 Claims, 16 Drawing Sheets

MAGNETIC RECORDING HEAD CONFIGURED TO REDUCE THE DEGRADATION OF RECORDED SIGNALS AND DISK DEVICE INCLUDING THE SAME

CROSS-REFERENCE TO RELATED APPLICATION(S)

This application is based upon and claims the benefit of priority from Japanese Patent Application No. 2012-091317, filed on Apr. 12, 2012; the entire contents of (if multiple applications, all of) which are incorporated herein by reference.

FIELD

Embodiments described herein relate to a magnetic recording head having a high frequency oscillator, and a disk device including the magnetic recording head.

BACKGROUND

A disk device, for example a magnetic disk device, includes a magnetic head and a carriage assembly. The magnetic head reads/writes data to/from a magnetic disk. The carriage assembly supports the magnetic head in a movable manner with respect to the magnetic disk. The magnetic head has a slider attached to a suspension, and a head part provided in the slider. The head part is configured to include a recording head for writing and a reproducing head for reading.

In recent years, a magnetic head for perpendicular magnetic recording has been proposed to further increase the recording density and capacity of the magnetic disk device and reduce the size thereof. In a magnetic head of this type, a recording head has a main magnetic pole, a trailing shield, and a coil. The main magnetic pole generates a perpendicular magnetic field. The trailing shield is arranged on a trailing side of the main magnetic pole with a write gap interposed between the main magnetic pole and the trailing shield, and closes a magnetic path between the magnetic disk and the trailing shield. The coil serves to pass a magnetic flux through the main magnetic pole. A high frequency oscillator (high frequency assist element) has been proposed that is disposed between a medium side end part of the trailing shield and the main magnetic pole, and the high frequency assist head in which a current flows to the high frequency oscillator through the main magnetic pole and the trailing shield to oscillate.

With the high frequency assist head having such high frequency oscillator, magnetization reversal of the medium recording layer occurs easier due to the high frequency oscillation by the high frequency oscillator, which advantageously improves the ability to record. However, a structure in which a magnetic pole includes a built-in high frequency assist element also has an effect in which a magnetic field in an opposite direction to recorded signals is intensified directly under the trailing shield in the vicinity of the write gap. The oppositely-directed magnetic field may deteriorate recorded-signals.

DETAILED DESCRIPTION

According to one embodiment, a magnetic recording head includes a main magnetic pole that generates a recording magnetic field in a direction perpendicular to a recording layer of a recording medium, a trailing shield that faces a trailing side of the main magnetic pole through a write gap interposed therebetween, a recording coil that generates a magnetic field in the main magnetic field, and a high frequency oscillator that is provided between a tip part of the main magnetic pole and the trailing shield in the write gap. The trailing shield includes a magnetic region including a gap side end surface facing the write gap and a nonmagnetic film arranged proximate the write gap in the trailing shield that is opposite to the write gap through the magnetic region interposed therebetween. The trailing shield is also within a plane including track width direction centers of the main magnetic pole and the high frequency oscillator and is perpendicular to the recording layer of the recording medium. A film thickness of the nonmagnetic film along a track moving direction is substantially equivalent to or more than a half of a distance from the gap side end surface to the nonmagnetic film.

According to another embodiment, a disk device includes a recording medium that includes a magnetic recording layer having magnetic anisotropy in a direction perpendicular to a medium surface, a driving part that rotates the recording medium, and the magnetic recording head discussed above that performs read and write operations on the recording medium.

Hereinafter, various embodiments will be described in detail with reference to the accompanying drawings.

First Embodiment

Figure 1:
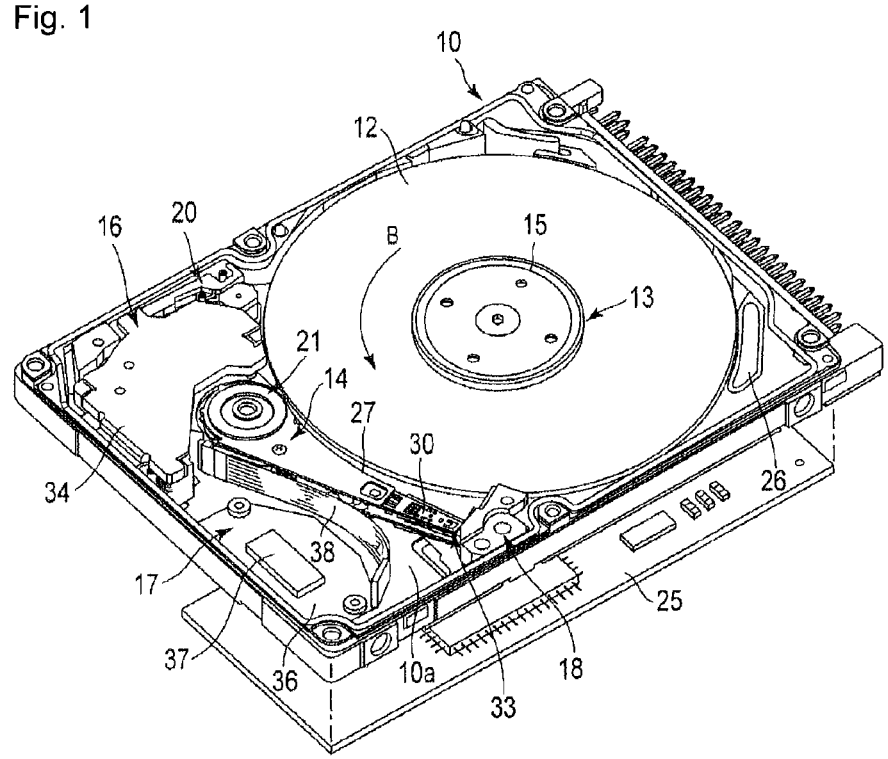
FIG. 1 is a perspective view illustrating a hard disk drive (hereinafter, referred to as HDD) according to a first embodiment.
Figure 2:
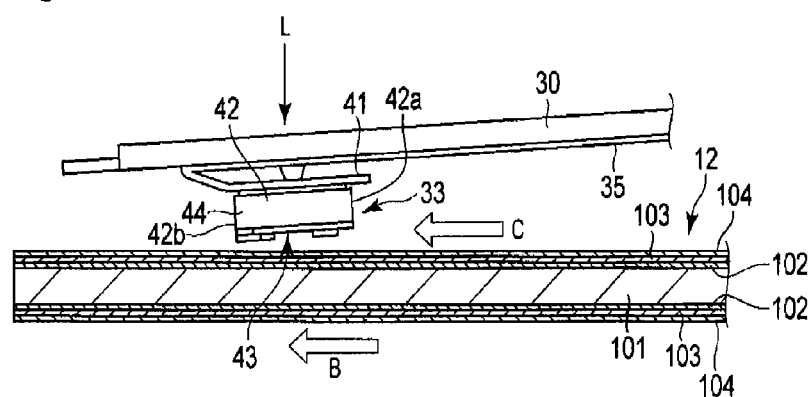
FIG. 2 is a side view illustrating a magnetic head and a suspension in the HDD.

FIG. 1 illustrates an internal structure of a HDD according to a first embodiment with its top cover off FIG. 2 illustrates a magnetic head in a flying state. As illustrated in FIG. 1, the HDD includes a case 10. The case 10 includes a base 10a in the form of a rectangular box that is open-topped and a top cover (not illustrated) in the form of a rectangular plate. The top cover is screwed on the base by multiple screws so as to close a top opening of the base. As a result, the inside of the case 10 is kept airtight, and air flows between the inside and the outside only take place through a breather filter 26.

On the base 10a, a magnetic disk 12 as a recording medium and a mechanism part are provided. The mechanism part includes a spindle motor 13, a plurality of (for example, two) magnetic heads 33, a head actuator 14, and a voice coil motor (hereinafter, referred to as VCM) 16. The spindle motor 13 supports and rotates the magnetic disk 12. The magnetic heads 33 record information to and reproduces information from the magnetic disk. The head actuator 14 supports the magnetic heads 33 in a movable manner with respect to a surface of the magnetic disk 12. The VCM 16 revolves and positions the head actuator. On the base 10a, a ramp load mechanism 18, a latch mechanism 20, and a board unit 17 are provided. The ramp load mechanism 18 holds the magnetic heads 33 at positions distanced from the magnetic disk 12 when the magnetic heads 33 are moved to an outermost periphery of the magnetic disk 12. The latch mechanism 20 holds the head actuator 14 at an evacuation position when the HDD is affected by a jolt and the like. The board unit 17 has electronic components such as a preamplifier, a head integrated circuit (IC), and the like mounted thereon.

A control circuit board 25 is screwed on an outer surface of the base 10a, and is positioned facing a bottom wall of the base 10a. The control circuit board 25 controls the operations of the spindle motor 13, the VCM 16, and the magnetic heads 33 via the substrate unit 17.

As illustrated in FIG. 1, the magnetic disk 12 is fit to a hub of the spindle motor 13 in a coaxial manner and clamped and fixed to the hub by a clamp spring 15, which is screwed to an upper end of the hub. The magnetic disk 12 is rotationally driven in the direction of an arrow B at a predetermined rate by the spindle motor 13 used as a drive motor.

The head actuator 14 includes a bearing part 24 and a plurality of arms 27. The bearing part 24 is fixed on the bottom wall of the base 10a. The arms 27 extend from the bearing part 24. The arms 27 are positioned in parallel to the surfaces of the magnetic disk 12 and at intervals therebetween, and extend in the same direction from the bearing part 24. The head actuator 14 includes elastically deformable suspensions 30 each in the shape of an elongated plate. Each suspension 30 is configured with a plate spring and has a proximal end fixed to a distal end of its corresponding arm 27 by spot welding or adhesion. Each suspension 30 extends from its corresponding arm. Each suspension 30 may be formed with its corresponding arm 27 in an integrated manner. At an end of the extended part of each suspension 30, its corresponding magnetic head 33 is supported. Each arm 27 and its corresponding suspension 30 configure a head suspension, and the head suspension and its corresponding magnetic head 33 configure a head suspension assembly.

As illustrated in FIG. 2, each magnetic head 33 has a substantially-cuboid-shaped slider 42 and a head part 44 for recording and reproduction that is provided at an outflow end (trailing end) of the slider. Each magnetic head 33 is fixed to a gimbal spring 41 provided at a distal part of the suspension 30. To each magnetic head 33, a head load L directed toward the surface of the magnetic disk 12 is applied due to the elasticity of the suspension 30. The two arms 27 are positioned in parallel to each other at a predetermined interval therebetween, and the suspensions 30 attached to the arms and the magnetic heads 33 face each other on both sides of the magnetic disk 12.

Each magnetic head 33 is electrically connected to a main flexible printed circuit (FPC) 38, which is described below, via a relay flexible printed circuit board (hereinafter, referred to as the relay FPC) 35 fixed on the suspension 30 and the arm 27.

As illustrated in FIG. 1, the board unit 17 has the FPC main part 36 formed with the FPC board, and a main FPC 38 extending from this FPC main part. The FPC main part 36 is fixed on the bottom surface of the base 10a. On the FPC main part 36, the preamplifier 37 and electronic components including head IC are mounted. The end of the extending part of the main FPC 38 is connected to the head actuator 14 and is connected to each magnetic head 33 via each relay FPC 35.

The VCM 16 has a supporting frame (not illustrated) extending from the bearing part 21 toward a direction opposite to the arms 27, and the voice coil supported by the supporting frame. In a state where the head actuator 14 is incorporated in the base 10a, the voice coil is positioned between a pair of yokes 34 fixed on the base 10a, and configures the VCM 16 with the yokes and a magnet fixed to the yokes.

By passing a current to the voice coil of the VCM 16 in a state where the magnetic disk 12 is rotating, the head actuator 14 revolves, and the magnetic head 33 is moved to and positioned on a desired track of the magnetic disk 12. Under the present circumstances, the magnetic head 33 is moved along a radial direction of the magnetic disk 12 between an inner periphery edge part and an outer periphery edge part of the magnetic disk.

Figure 3:
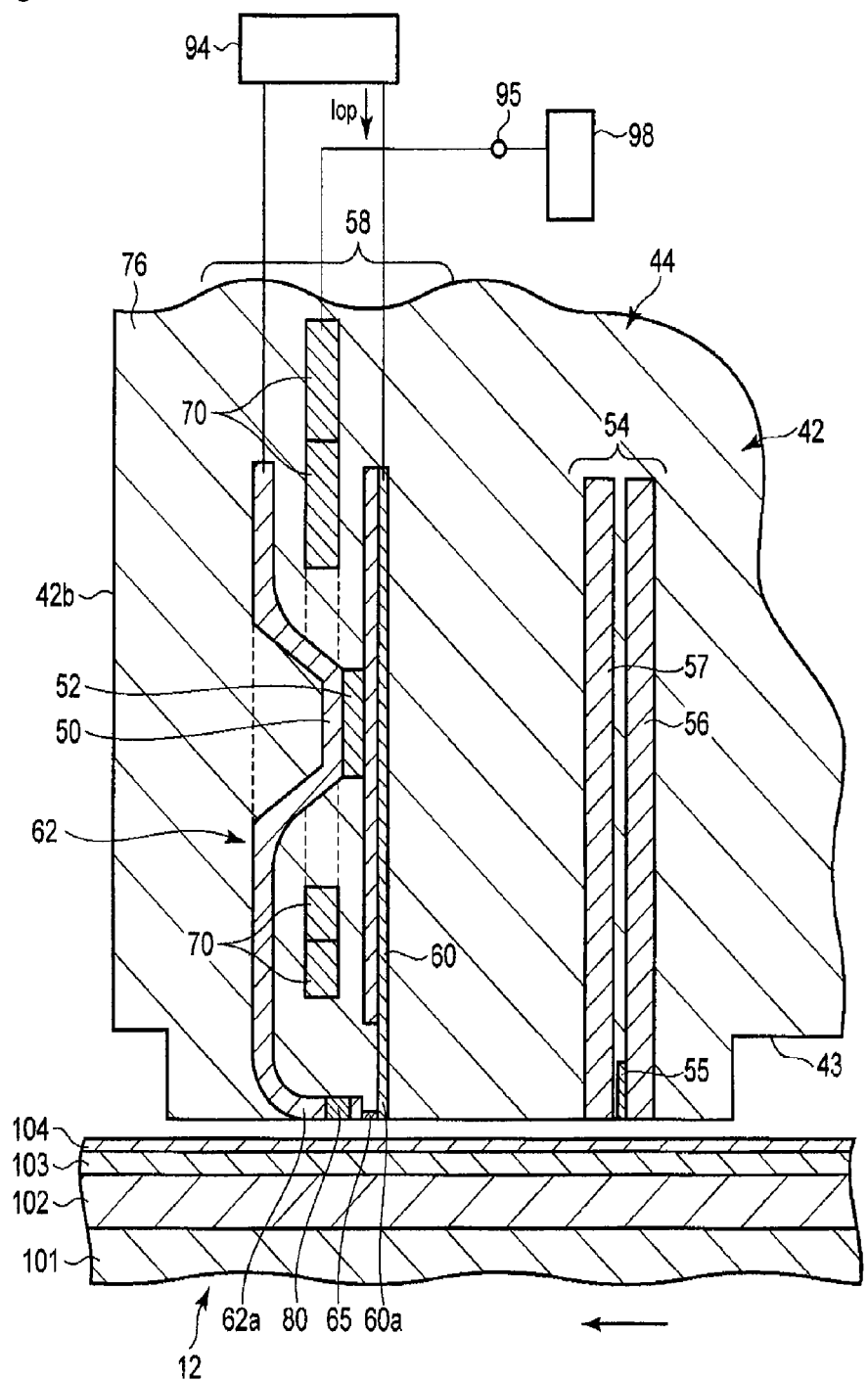
FIG. 3 is an enlarged cross-sectional view illustrating a head part of the magnetic head.

Next, detail descriptions of configurations of the magnetic disk 12 and the magnetic head 33 are given. FIG. 3 is an enlarged cross-sectional view of the head part 44 of the magnetic head 33 and the magnetic disk.

As illustrated in FIG. 1 through FIG. 3, the magnetic disk 12 has a substrate 101 that is for example formed in a disk shape having a diameter of about 2.5 inches and made of a nonmagnetic body. On each surface of the substrate 101, a soft magnetic layer 102 is laminated that is an under layer made of a material having a soft magnetic property. On the soft magnetic layer 102, a magnetic recording layer 103 is laminated that has a magnetic anisotropy in a direction perpendicular to a disk surface. On the magnetic recording layer 103, a protective layer 104 is laminated.

As illustrated in FIG. 2 and FIG. 3, the magnetic head 33 is configured as a flying type head and has a slider 42 formed in a substantially cuboid shape and a head part 44 formed at an end part of the slider on the outflow end (trailing) side. The slider 42 is formed of, for example, a sintered compact of alumina and titanium carbide (ALTIC), and the head part 44 is formed by laminating a plurality of thin films.

The slider 42 has a rectangular-shaped surface (air bearing surface: ABS) 43 facing the surface of the magnetic disk 12. The slider 42 flies due to an air flow C generated between the disk surface and the ABS 43 by rotation of the magnetic disk 12. The direction of the air flow C is identical to a rotation direction B of the magnetic disk 12. The slider 42 is arranged so that a longitudinal direction of the ABS 43 is substantially identical to the direction of the air flow C with respect to the surface of the magnetic disk 12.

The slider 42 has a leading end 42a positioned in an inflow side of the air flow C and a trailing end 42b positioned in the outflow side of the air flow C. On the ABS 43 of the slider 42, a leading step, a trailing step, a side step, a negative pressure cavity, and the like (not shown) are formed.

As illustrated in FIG. 3, the head part 44 has a reproducing head 54 and a recording head (magnetic recording head) 58 formed at the trailing end 42b of the slider 42 in a thin film process, and is formed as a separate type magnetic head. The reproducing head 54 and the recording head 58 are covered by a protective insulation film 76 except for the portion of the slider 42 exposed to the ABS 43. The protective insulation film 76 configures the outer shape of the head part 44.

The reproducing head 54 is configured with a magnetic film 55 having a magneto-resistive effect, and shield films 56 and 57 that are arranged so as to sandwich the magnetic film 55 from a trailing side and a leading side of the magnetic film. Bottom ends of the magnetic film 55 and the shield films 56 and 57 are exposed to the ABS 43 of the slider 42.

Figure 4:
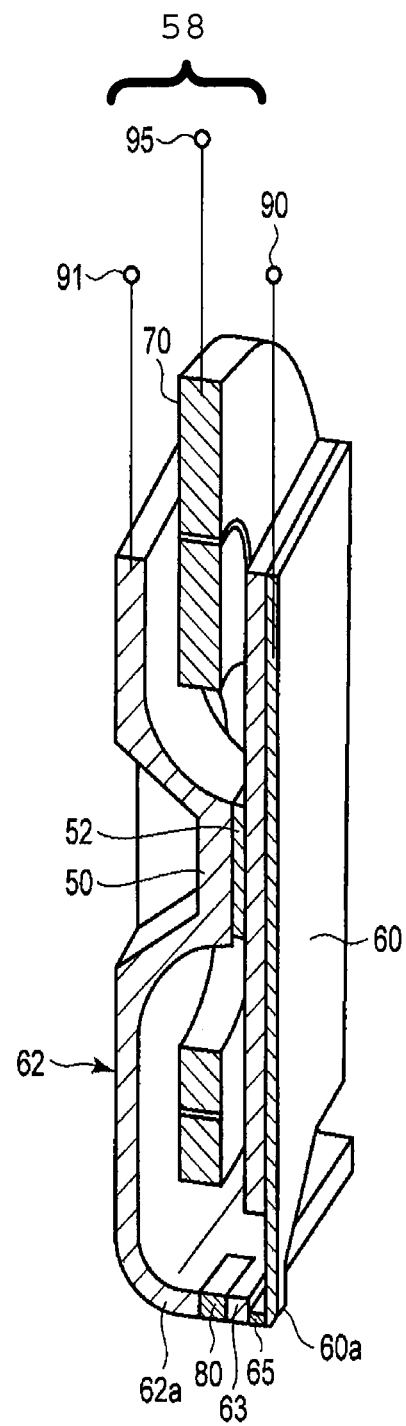
FIG. 4 is a perspective view schematically illustrating a recording head of the magnetic head.

The recording head 58 is provided on the trailing end 42b side of the slider 42 with respect to the reproducing head 54. FIG. 4 is a perspective view schematically illustrating the recording head 58.

As illustrated in FIG. 3 and FIG. 4, the recording head 58 has a main magnetic pole 60, a trailing shield (return magnetic pole) 62, a recording coil 70, and a high frequency oscillator (for example, a spin torque oscillator 65). The main magnetic pole 60 is formed of a high saturation magnetization material that generates a recording magnetic field in a direction perpendicular to the surface of the magnetic disk 12. The trailing shield (return magnetic pole) 62 is arranged on the trailing side of the main magnetic pole 60 and is provided so as to efficiently close a magnetic path via a soft magnetic layer 102 directly under the main magnetic pole. The recording coil 70 is wound around a magnetic circuit including the main magnetic pole 60 and the trailing shield 62 to cause a magnetic flux flow through the main magnetic pole 60 for writing signals to the magnetic disk 12. The high frequency oscillator (for example, the spin torque oscillator 65) is formed of a nonmagnetic conductive body arranged between the tip part 60a of the main magnetic pole 60 and the trailing shield 62 and on a portion of the ABS.

A power supply 94 is connected to the main magnetic pole 60 and the trailing shield 62, and a current circuit is configured so that a current is passed in series from the power supply through the main magnetic pole 60, the spin torque oscillator 65, and the trailing shield 62.

The main magnetic pole 60 extends substantially perpendicularly to the surface of the magnetic disk 12 and the ABS 43. The tip part 60a of the main magnetic pole 60 on the magnetic disk 12 side is tapered near the disk surface. The end of the tip part 60a, i.e., the bottom end, is exposed to the ABS 43 of the magnetic head. The width of the tip part 60a in the track width direction is approximately equal to the width of a track of the magnetic disk 12.

The trailing shield 62 formed with a soft magnetic body is arranged on the trailing side of the main magnetic pole 60 and is provided so as to efficiently close a magnetic path via the soft magnetism layer 102 directly under the main magnetic pole. The trailing shield 62 is substantially formed in an L-shape and has a tip part 62a facing the tip part of the main magnetic pole 60 and a connection part 50 connected to the main magnetic pole 60. The connection part 50 is connected to an upper portion of the main magnetic pole 60, i.e., the upper part or distal end that is furthest from the ABS 43 via a nonmagnetic conductive body 52.

Figure 5:
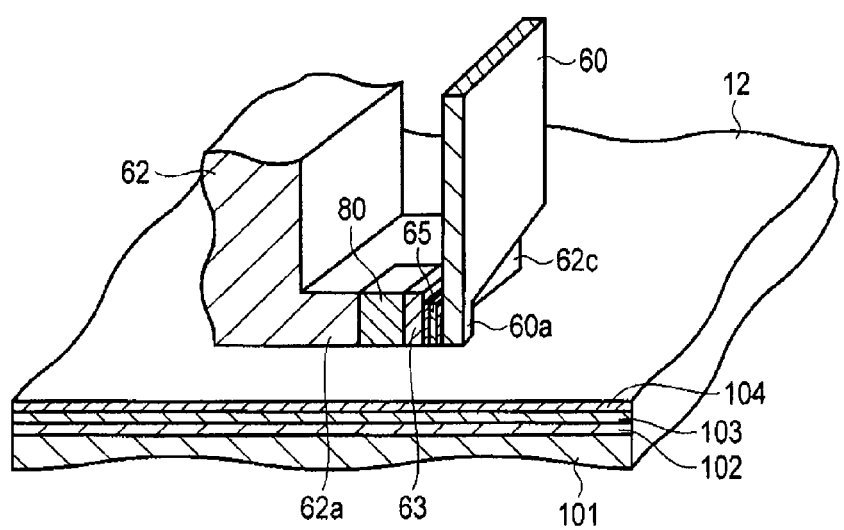
FIG. 5 is a perspective view illustrating a disk side end part of the recording head cross-sectioned along a perpendicular plane including a track center.
Figure 6:
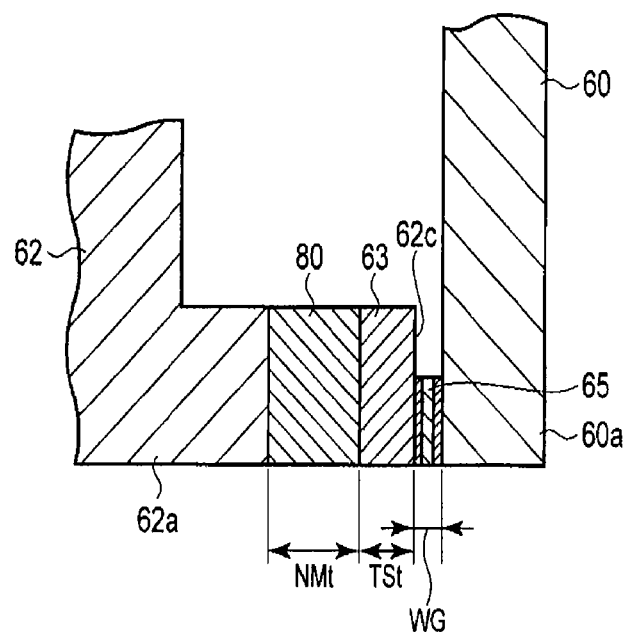
FIG. 6 is a cross-sectional view illustrating a tip part of the recording head and a high frequency oscillator.

FIG. 5 is a perspective view illustrating an end part of the recording head 58 on a magnetic disk cross-sectioned along a track center. FIG. 6 is a cross-sectional view of an end part of the recording head 58 on the magnetic disk side cut along a track center.

As illustrated in FIG. 3 through FIG. 6, the tip part 62a of the trailing shield 62 is formed in a narrow and long rectangular shape. A tip surface (bottom surface) of the trailing shield 62 is exposed to the ABS 43 of the slider 42. A gap facing end surface (leading end surface) 62c of the tip part 62a extends along the track width direction of the magnetic disk 12. This gap facing end surface 62c faces and is opposite to the tip part 60a of the main magnetic pole 60, and is in parallel with the main magnetic pole 60 to define a write gap WG interposed therebetween.

The spin torque oscillator 65 is disposed in the write gap WG between the tip part 60a of the main magnetic pole 60 and the gap facing end surface 62c of the trailing shield 62. The spin torque oscillator 65 is configured with a width that is almost the same as the width of the tip part 60a of the main magnetic pole 60 in the track width direction. The spin torque oscillator 65 is configured by laminating an under layer, a spin injection layer (second magnetic body layer), an intermediate layer, an oscillation layer (first magnetic body layer), and a cap layer (in this order) from the main magnetic pole 60 side toward the trailing shield 62 side.

As illustrated in FIG. 3 and FIG. 4, terminals 90 and 91 are respectively connected to the main magnetic pole 60 and the trailing shield 62, and the terminals 90 and 91 are also connected to the power supply 94. A current circuit is configured such that a current Top is passed in series from the power supply 94 through the main magnetic pole 60, the spin torque oscillator 65, and the trailing shield 62. By passing this current, the spin torque oscillator 65 oscillates a high frequency magnetic field and applies the magnetic field to the recording layer 103 of the magnetic disk 12.

The recording coil 70 is, for example, wound around the connection part 50 between the main magnetic pole 60 and the trailing shield 62. A terminal 95 is connected to the recording coil 70, and a second power supply 98 is connected to the terminal 95. A current supplied to the recording coil 70 from the second power supply 98 is controlled by a control part of the HDD. A predetermined current is supplied to the recording coil from the second power supply 98 for writing signals to the magnetic disk 12, which causes a magnetic flux to flow to the main magnetic pole 60 and generates a magnetic field.

As illustrated in FIG. 5 and FIG. 6, the tip part 62a of the trailing shield 62 includes a magnetic region 63 including the gap facing end surface 62c facing the write gap WG and a nonmagnetic film 80 arranged in the trailing shield in the vicinity of the write gap WG. The nonmagnetic film 80 is on an opposite side of the magnetic region 63 than the spin torque oscillator 65, thus, the magnetic region 63 is interposed between the nonmagnetic film 80 and the spin torque oscillator 65. In the present embodiment, the nonmagnetic film 80 extends substantially in parallel to the gap facing end surface 62c. The nonmagnetic film 80 is formed of $Al_2O_3$, Ru, Cu, Ta, C, and the like. In addition, the nonmagnetic film 80 may be a conductive film.

Within a plane (track center cross-section) along the track width direction centers of the main magnetic pole 60 and the spin torque oscillator 65 and perpendicular to the recording layer 103 of the magnetic disk 12, a film thickness NMt of the nonmagnetic film 80 in the direction perpendicular to the gap facing end surface 62c is set to be substantially equivalent to or more than a half of a distance (i.e., film thickness of the magnetic region 63) TSt from the gap facing end surface 62c to the nonmagnetic film 80. Moreover, in the present embodiment, the film thickness NMt of the nonmagnetic film 80 is set to be TSt/2≤NMt≤3TSt. Furthermore, the distance TSt is set to be equivalent to or more than the thickness of the write gap WG in the direction perpendicular to the gap facing end surface 62c and is set to be no more than twice the thickness of the write gap (thus, WG≤TSt≤2WG). The length of the nonmagnetic film 80 in the track width direction is set to be longer than the width of the spin torque oscillator 65 in the track width direction.

According to the HDD configured as described above, the head actuator 14 revolves by driving the VCM 16, and the magnetic head 33 is moved to and is positioned on an intended track of the magnetic disk 12. Moreover, the magnetic head 33 flies by the air flow C generated between the disk surface and the ABS 43 by the rotation of the magnetic disk 12. During the operation of the HDD, the ABS 43 of the slider 42 faces the disk surface with a space therebetween. As illustrated in FIG. 2, the magnetic head 33 flies with an inclined position, where a recording head 58 portion of the head part 44 most closely approaches the surface of the magnetic disk 12. In such a state, reading of recorded information from the magnetic disk 12 is performed by the reproducing head 54, and writing of information is performed by the recording head 58.

During write operations, as illustrated in FIG. 3, a DC current is passed from the power supply 94 through the main magnetic pole 60, the spin torque oscillator 65, and the trailing shield 62. As a result, a high frequency magnetic field is generated from the spin torque oscillator 65, and the high frequency magnetic field is applied to the magnetic recording layer 103 of the magnetic disk 12, Moreover, due to an AC current flowing from the power supply 98 through the recording coil 70, the main magnetic pole 60 is excited by the recording coil 70, and a recording magnetic field in the perpendicular direction is applied from the main magnetic pole to the recording layer 103 of the magnetic disk 12 positioned directly under the main magnetic pole. Therefore, information is recorded to the magnetic recording layer 103 in a desired track width. By superimposing the high frequency magnetic field on a recording magnetic field, magnetic recording with high coercive force and high anisotropy energy can be performed. Moreover, by a current flowing from the main magnetic pole 60 to the trailing shield 62, scatter of a magnetic domain in the main magnetic pole 60 can be removed, and an efficient magnetic path is formed. As a result, the magnetic field generated from the tip of the main magnetic pole is intensified.

Moreover, by providing the nonmagnetic film 80 in the trailing shield 62 of the recording head and setting the film thickness NMt of the nonmagnetic film 80 to be substantially equivalent to or more than a half of the distance (film thickness of the magnetic region 63) TSt from the gap facing end surface 62c to the nonmagnetic film 80, the signal degradation of the recorded signals by the reverse magnetic field directly under the trailing shield 62 can be controlled. As a result, it becomes possible to maintain a recording signal with a high signal to noise (SN) ratio, which is recorded while the high frequency oscillator performs high frequency assistance, to achieve a higher track density of the recording layer of the magnetic disk 12 and the improvement in the recording density of HDD.

Figure 7:
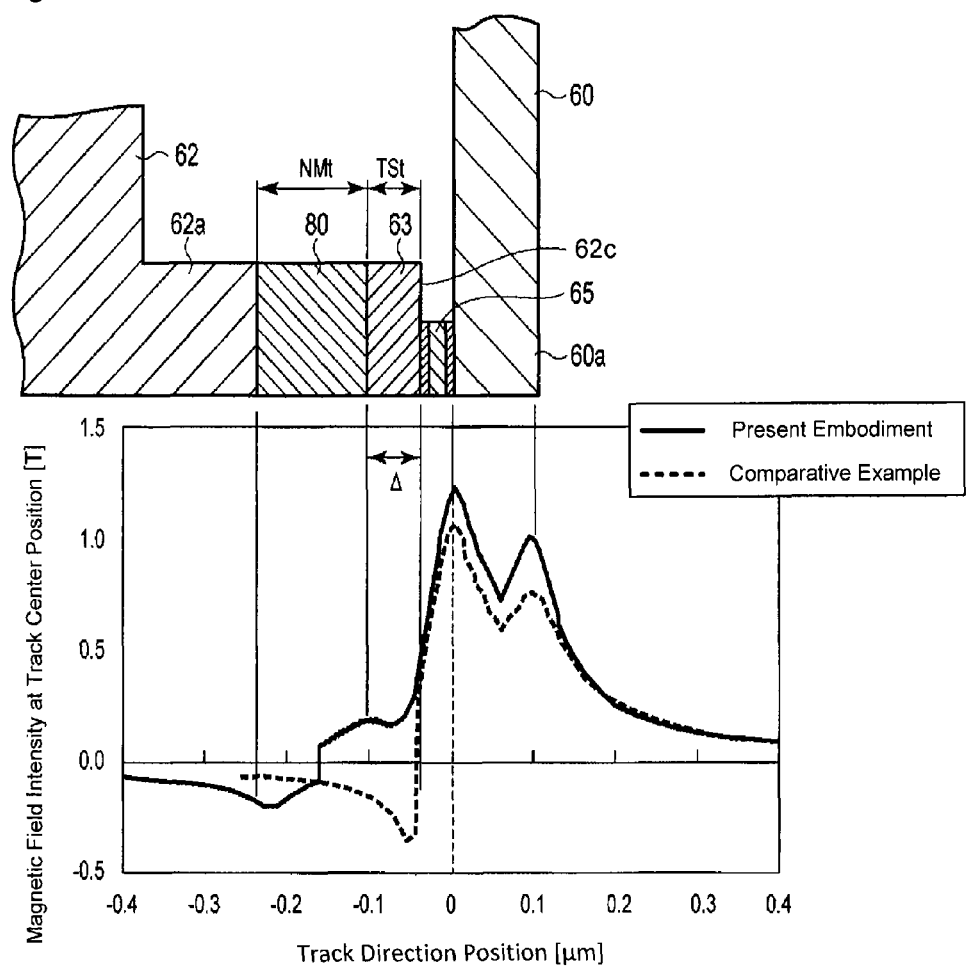
FIG. 7 is an illustration, with respect to the recording head according to the first embodiment and a recording head according to a comparative example, of the relationships between the track direction positions and the track direction magnetic field intensities in comparison.

FIG. 7 illustrates a comparison between a magnetic field intensity distribution in a track moving direction of the magnetic recording head 58 configured as described above and a magnetic field intensity distribution of a magnetic recording head according to a comparative example. Herein, the magnetic recording head according to the comparative example is a high frequency assist recording head in which the nonmagnetic film 80 is not provided in the trailing shield. As illustrated in FIG. 7, the recording head according to the comparative example generates a magnetic field (having a positive direction in the figure) from the main magnetic pole 60 and a magnetic field (having a negative direction in the figure) from the trailing end part of the trailing shield, and the two magnetic fields are oppositely directed. Under such circumstances, data recorded by the main magnetic pole 60 may be erased or otherwise altered, because the high frequency assist recording head also assists the oppositely directed magnetic field under the trailing shield 62 and in a Δ region.

On the other hand, the recording head according to the present embodiment, in which the nonmagnetic film 80 is provided, generates a magnetic field with the same polarity as that of the main magnetic pole 60 under the trailing shield 62 and in the Δ region. Therefore, even when the spin torque oscillator 65 performs the high frequency assist, the data recorded by the main magnetic pole 60 is not erased.

Figure 8:
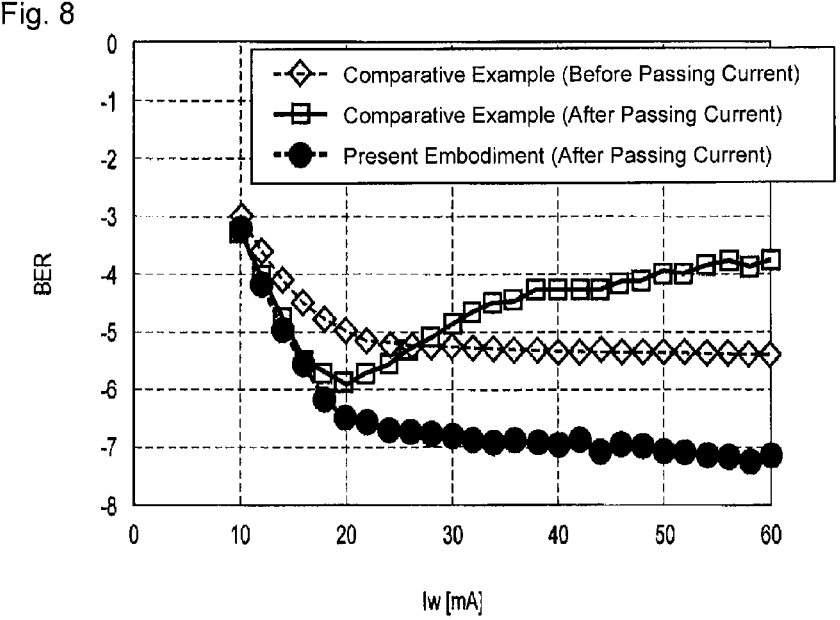
FIG. 8 is a graph, with respect to the recording head according to the first embodiment and the recording head according to the comparative example, of the relationships between the head application currents and the bit error rates (BER) in cases before passing a current and after passing a current to the high frequency oscillator.

FIG. 8 illustrates a comparison of current dependencies of bit error rates (BER) of the magnetic recording head according to the present embodiment and the magnetic recording head according to the comparative example. From the figure, in the case of the magnetic recording head configured according to the comparative example, recording is performed only with the magnetic pole without oscillating the high frequency assist element (before passing current), and a BER thereof tends to improve as a current Iw increases as indicated by ◇. Also, in a case of oscillating the high frequency assist element (after passing current), a BER thereof tends to be good on a low current side of 20 mA or less as indicated by ☐ as compared to the before passing current; however, the BER tends to deteriorate on a high current side as compared to the before passing current. The high frequency assist phenomena accelerates precession movement of magnetization within the medium in addition to the magnetic field generated from the magnetic pole to be applied to the medium, so that the magnetization of the medium is more likely to reverse. Therefore, the magnetic field generated from the magnetic pole tends to intensify. When the recording layer passes directly under the high frequency assist element, the assist is performed in an expected direction to which the magnetization is reversed; however, a return magnetic field in a direction opposite to the expected direction to which the magnetization is reversed is generated under the trailing shield, so that the oppositely-directed return magnetic field is amplified at the trailing shield position near the high frequency assist element. Thus, there is a phenomenon in which the recorded signal is degraded by the oppositely-directed magnetic field. Consequently, the BER deteriorates (☐) at higher currents, where the oppositely-directed return magnetic field is large.

The magnetic recording head according to the present embodiment has a magnetic pole structure avoiding generation of an oppositely-directed magnetic field at a portion of the trailing shield 62 near the write gap WG. Therefore, as indicated by ● in FIG. 8, when using the recording head 58, the deterioration of the recorded signal doesn't occur and a BER thereof is reduced proportionally.

Figure 9:
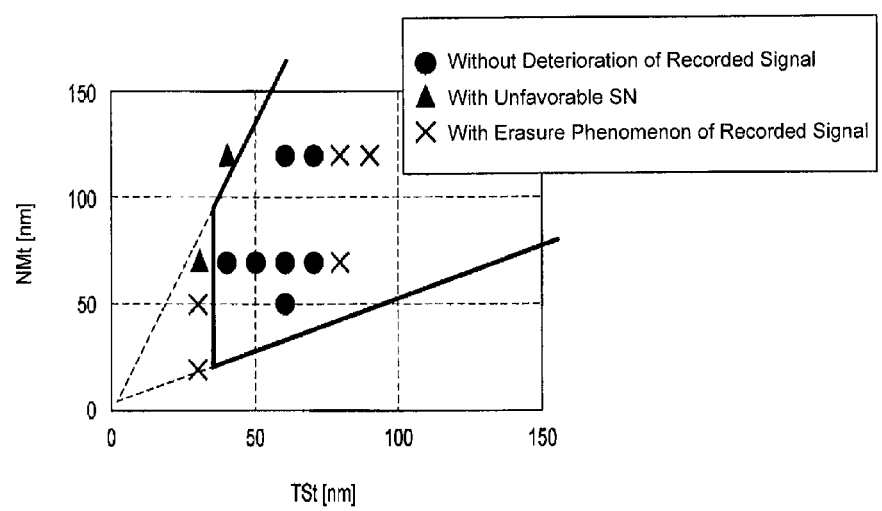
FIG. 9 is a graph illustrating the existence or nonexistence of erasure phenomenon of the recorded signals by the sizes of the distance Tst of the trailing shield and the film thickness NMt of the nonmagnetic film.

FIG. 9 illustrates the presence or absence of the erasure phenomenon of the recorded signal by the sizes of the distance Tst of the trailing shield 62 and the film thickness NMt of the nonmagnetic film 80. BER is used as a measure. Then, a recorded signal for which BER on the high current side has deteriorated is compared to the BER before passing a current through the high frequency assist element, and this is used to judge recorded signal deterioration. Using the metric, the presence or absence of the erasure phenomena is indicated. In FIG. 9, recorded signals under a condition where sizes of the TSt and the NMt are indicated by ● have no deterioration of the recorded signals, and recorded signals indicated by × have the deterioration of the recorded signals. Considering the value of both sizes, in the range of TSt/2≤NMt≤3×TSt, the deterioration of the recorded signals can be suppressed.

As described above, when the hard disk device using the high frequency oscillator includes the magnetic recording head according to the present embodiment, a high linear recording density can be achieved.

Next, descriptions regarding HDDs according to other embodiments are given. Note, in the following description of the other embodiments, the same reference numbers are given to portions corresponding to portions of the above-described first embodiment, and its detailed descriptions are omitted. Portions different from the corresponding portions of the first embodiment are primarily described in detail.

Second Embodiment

Figure 10:
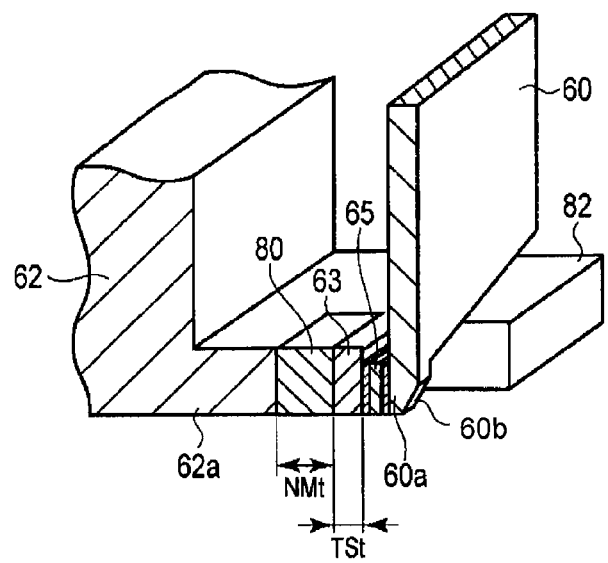
FIG. 10 is a perspective view illustrating a disk side end part of a recording head according to a second embodiment, cross-sectioned along a perpendicular plane including the track center.

FIG. 10 is a perspective view illustrating a magnetic recording head in a HDD according to a second embodiment and illustrates a magnetic recording head portion cross-sectioned along the track center in the vicinity of the write gap.

According to the present embodiment, the recording head has a magnetic core that forms a magnetic path and is formed with the main magnetic pole 60, the trailing shield 62, and the side shield 82. The main magnetic pole 60 made of a soft magnetic material has an inclined surface 60b and tapered at the tip part 60a toward the ABS along the track moving direction. The side shield 82 is arranged on both sides of the main magnetic pole with respect to the track width direction so as to be physically separated from the main magnetic pole 60 and connected to the trailing shield 62. Also, the recording head includes the spin torque oscillator 65 and a nonmagnetic film 80. The spin torque oscillator 65 is arranged at a connection part between the main magnetic pole 60 and the trailing shield 62 and at a part facing the ABS, and is configured as a high frequency oscillator. The nonmagnetic film 80 is configured substantially parallel to the gap facing end surface 62c in the vicinity of the write gap WG in the trailing shield 62. A film thickness NMt of the nonmagnetic film 80 is set to be in a range of TSt/2≤NMt≤3TSt.

In the recording magnetic head with the above-described configuration, with the recording magnetic field generated by applying a recording current through the recording coil configured to wind around the magnetic core and by the oscillation of the high frequency assist film caused by a current flowing in series through the main magnetic pole 60, the spin torque oscillator 65, and the trailing shield 62, it becomes possible to record recording signals with a good SN ratio to the medium without deteriorations of the recorded signals.

Third Embodiment

Figure 11:
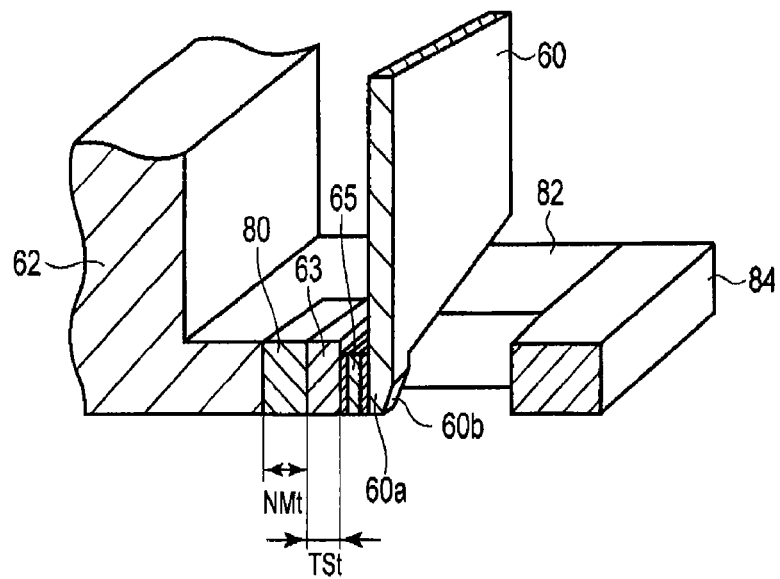
FIG. 11 is a perspective view illustrating a disk side end part of a recording head according to a third embodiment, cross-sectioned along a perpendicular plane including the track center.

FIG. 11 is a perspective view illustrating a magnetic recording head in a HDD according to a third embodiment and illustrates a magnetic recording head portion cut along the track center in the vicinity of the write gap.

According to the present embodiment, the magnetic recording head further includes a leading shield 84 in addition to the above-described recording head according to the second embodiment. The leading shield 84 is arranged on the leading side of the main magnetic pole 60 so as to be physically separated from the main magnetic pole and to be connected to the side shield 82. Other configurations thereof are the same as those of the recording heads according to the first and second embodiments.

In the recording magnetic head with the above-described configuration, with the recording magnetic field generated by applying a recording current to the recording coil and by the oscillation of the high frequency assist film generated by a current flowing in series through the main magnetic pole 60, the spin torque oscillator 65, and the trailing shield 62, it becomes possible to record recording signals with a good SN ratio to the medium without deterioration of the recorded signals.

Fourth Embodiment

Figure 12:
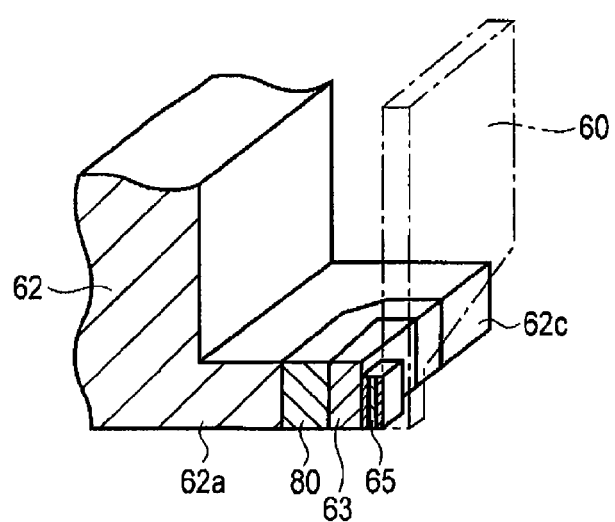
FIG. 12 is a perspective view illustrating a disk side end part of a recording head according to a fourth embodiment, cross-sectioned along a perpendicular plane including the track center.

FIG. 12 is a perspective view illustrating a magnetic recording head in a HDD according to a fourth embodiment and illustrates a magnetic recording head portion cross-sectioned along the track center in the vicinity of the write gap.

According to the present embodiment, the recording head includes a magnetic core, the spin torque oscillator 65, and the nonmagnetic film 80. The magnetic core is formed with the main magnetic pole 60 made of a soft magnetic material and the trailing shield 62 and forms a magnetic path. The spin torque oscillator 65 is arranged at the connection part between the main magnetic pole 60 and the trailing shield 62 and a portion facing the ABS. The nonmagnetic film 80 is arranged in the vicinity of the write gap WG in the trailing shield 62 to cause a magnetic region 63 in the vicinity of the write gap of the trailing shield 62 to be magnetically separate from the trailing shield 62. In other words, both end parts of the nonmagnetic film 80 in the track width direction are bent to the gap facing end surface 62c side, and are exposed to the gap facing end surface and the write gap. As seen from the ABS side, the nonmagnetic film 80 is formed in a substantially U-shape and surrounds the magnetic region 63 of the trailing shield 62.

On the track center cross-section, the film thickness NMt of the nonmagnetic film 80 is set to be in a range of TSt/2≤NMt≤3TSt.

In the recording magnetic head with the above-described configuration, with the recording magnetic field generated by applying a recording current to the recording coil and by the oscillation of the high frequency assist film generated by a current flowing in series through the main magnetic pole 60, the spin torque oscillator 65, and the trailing shield 62, it is possible to record recording signals with a good SN ratio to the medium without deteriorations of the recorded signals.

Fifth Embodiment

Figure 13:
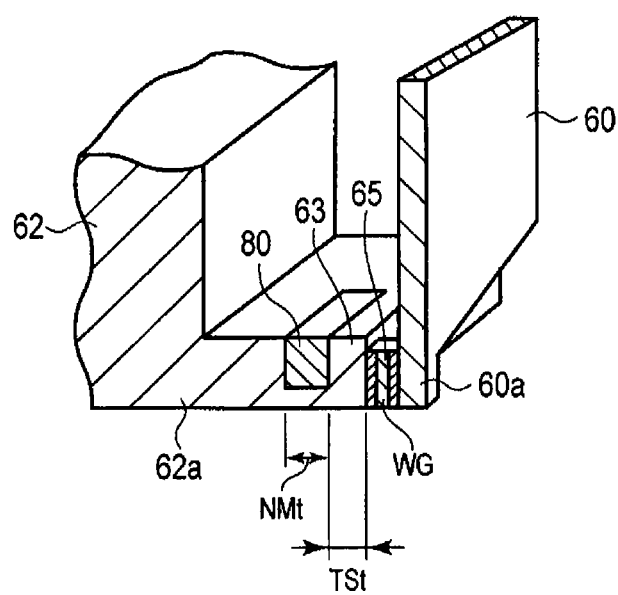
FIG. 13 is a perspective view illustrating a disk side end part of a recording head according to a fifth embodiment, cross-sectioned along a perpendicular plane including the track center.

FIG. 13 is a perspective view illustrating a magnetic recording head in a HDD according to a fifth embodiment and illustrates a magnetic recording head portion cross-sectioned along the track center in the vicinity of the write gap.

According to the present embodiment, the recording head includes a magnetic core, the spin torque oscillator 65, and the nonmagnetic film 80. The magnetic core is formed with the main magnetic pole 60 made of a soft magnetic material and the trailing shield 62 and forms a magnetic path. The spin torque oscillator 65 is arranged at the connection part between the main magnetic pole 60 and the trailing shield 62 and a portion facing the ABS. The nonmagnetic film 80 is arranged in the vicinity of the write gap WG in the trailing shield so as to magnetically separate only a region of the trailing shield 62 that is separated from the ABS. In other words, the nonmagnetic film 80 is formed at a position that is not in contact with the ABS, and instead the magnetic region continues in a region on the ABS side of the nonmagnetic film 80.

On the track center cross-section, the film thickness NMt of the nonmagnetic film 80 is set to be a range of TSt/2≤NMt≤3TSt.

In the recording magnetic head with the above-described configuration, with the recording magnetic field generated by applying a recording current to the recording coil and by the oscillation of the high frequency assist film generated by a current flowing in series through the main magnetic pole 60, the spin torque oscillator 65, and the trailing shield 62, it is possible to record recording signals with a good SN ratio to the medium without deteriorations of the recorded signals.

Sixth Embodiment

Figure 14:
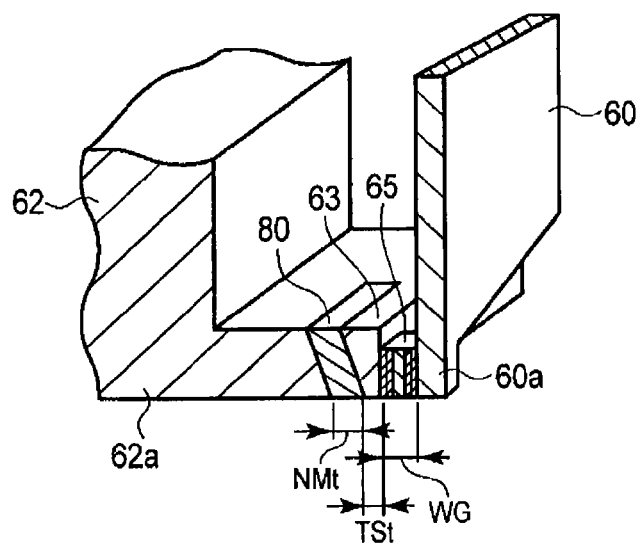
FIG. 14 is a perspective view illustrating a disk side end part of a recording head according to a sixth embodiment, cross-sectioned along a perpendicular plane including the track center.

FIG. 14 is a perspective view illustrating a magnetic recording head in a HDD according to a sixth embodiment and illustrates a magnetic recording head portion cross-sectioned along the track center in the vicinity of the write gap.

According to the present embodiment, the recording head includes the magnetic film 80 arranged in the vicinity of the write gap WG in the trailing shield 62. The nonmagnetic film 80 is arranged inclined in a trailing-leading direction of the track moving direction with respect to the gap side end surface of the trailing shield. Thus, the nonmagnetic film 80 is configured with an inclination at a non-normal angle to the ABS, so that a region of the nonmagnetic film 80 that forms part of the ABS is disposed closer to the write gap than other portions of the nonmagnetic film 80. Other configurations thereof are the same as those of the recording head according to the first embodiment.

On the track center cross-section, the film thickness NMt of the nonmagnetic film 80 is set to be in a range of TSt/2≤NMt≤3TSt.

In the recording magnetic head with the above-described configuration, with the recording magnetic field generated by applying a recording current to the recording coil and by the oscillation of the high frequency assist film generated by a current flowing in series through the main magnetic pole 60, the spin torque oscillator 65, and the trailing shield 62, it is possible to record recording signals with a good SN ratio to the medium without deteriorations of the recorded signals.

Seventh Embodiment

Figure 15:
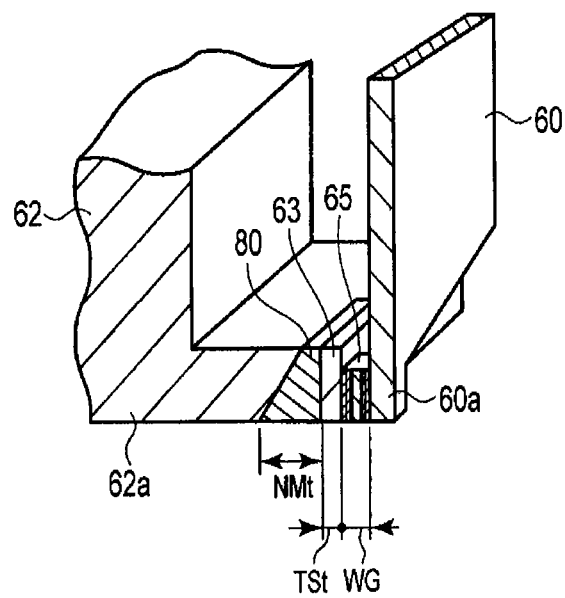
FIG. 15 is a perspective view illustrating a disk side end part of a recording head according to a seventh embodiment, cross-sectioned along a perpendicular plane including the track center.

FIG. 15 is a perspective view illustrating a magnetic recording head in a HDD according to a seventh embodiment and illustrates a magnetic recording head portion cross-sectioned along the track center in the vicinity of the write gap.

According to the present embodiment, the recording head includes the nonmagnetic film 80 arranged in the vicinity of the write gap WG in the trailing shield 62. The nonmagnetic film 80 is formed such that its film thickness becomes gradually thinner as the nonmagnetic film 80 approaches toward the deep side from the ABS, that is, toward the direction distant from the ABS. Thus, the nonmagnetic film 80 is configured with a thicker portion adjacent the ABS and a thinner portion distal from the ABS. Other configurations thereof are the same as those of the recording head according to the first embodiment.

On the track center cross-section, the maximum film thickness NMt of the nonmagnetic film 80 is set to be in a range of TSt/2≤NMt≤3TSt.

In the recording magnetic head with the above-described configuration, with the recording magnetic field generated by applying a recording current to the recording coil and by the oscillation of the high frequency assisted film generated by a current flowing in series through the main magnetic pole 60, the spin torque oscillator 65, and the trailing shield 62, it is possible to record recording signals with a good SN ratio to the medium without deteriorations of the recorded signals.

Eighth Embodiment

Figure 16:
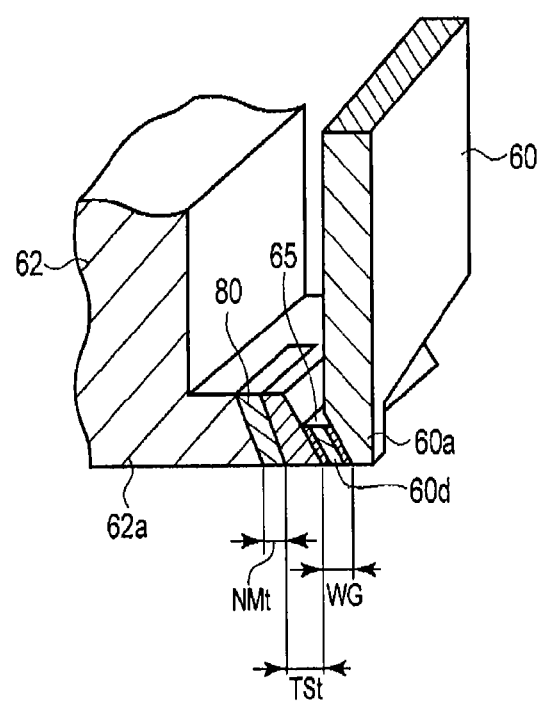
FIG. 16 is a perspective view illustrating a disk side end part of a recording head according to an eighth embodiment, cross-sectioned along a perpendicular plane including the track center.

FIG. 16 is a perspective view illustrating a magnetic recording head in a HDD according to an eighth embodiment and illustrates a magnetic recording head portion cross-sectioned along the track center in the vicinity of the write gap.

According to the present embodiment, the recording head includes the nonmagnetic film 80 arranged in the vicinity of the write gap WG in the trailing shield 62. Also, a gap side end surface 60d of the tip part 60a of the main magnetic pole 60, the gap side end surface of the trailing shield 62, and the nonmagnetic film 80 are formed inclined in the track moving direction. Similarly, the spin torque oscillator 65, which is provided in the write gap WG between the gap side end surface 60d of the tip part 60a of the main magnetic pole 60 and the gap side end surface of the trailing shield 62, is formed inclined in the track moving direction. Note, that the above-referenced elements of the recording head are formed to be flat on the ABS, that is, in parallel to the ABS. Other configurations thereof are the same as those of the recording head according to the first embodiment.

On the track center cross-section, the maximum film thickness NMt of the nonmagnetic film 80 is set to be in a range of TSt/2≤NMt≤3TSt.

In the recording magnetic head with the above-described configuration, with the recording magnetic field generated by applying a recording current to the recording coil and by the oscillation of the high frequency assisted film generated by a current flowing in series through the main magnetic pole 60, the spin torque oscillator 65, and the trailing shield 62, it is possible to record recording signals with a good SN ratio to the medium without deteriorations of the recorded signals.

These embodiments that have been described are not intended to limit the scope of the invention and are presented by way of example only. Indeed, the novel embodiments described herein may be embodied by modifying components without departing from the scope of the inventions. Any combination of multiple components disclosed in the above-described embodiments may form various embodiments. For example, some components may be eliminated from the described embodiments without exceeding the scope of the invention. Furthermore, components according to different embodiments may be variously combined.

For example, it is possible to change the material, shape, size, and the like of elements configuring the head part as necessary. Also, it is possible to increase the number of magnetic disks and magnetic heads in the magnetic disk device as necessary, and the size of magnetic disks may vary. The magnetic region of the trailing shield may be configured to be a lamination structure in which magnetic films and nonmagnetic films are alternately laminated.

What is claimed is:

1. A magnetic recording head, comprising:
a main magnetic pole that generates a recording magnetic field in a direction perpendicular to a recording layer of a recording medium;
a trailing shield disposed on a trailing side of the main magnetic pole with a write gap interposed therebetween; and
a high frequency oscillator that is provided between the main magnetic pole and the trailing shield in the write gap, wherein
the trailing shield has a non-magnetic part and a magnetic part that is between the non-magnetic part and the oscillator that borders the write gap within a plane including track width direction centers of the main magnetic pole and the high frequency oscillator and being perpendicular to the recording layer of the recording medium, a film thickness of the non-magnetic part along a track moving direction is substantially equivalent to or more than a half of a distance from the gap side end surface to the non-magnetic part.

2. The magnetic recording head according to claim 1, wherein a thickness of the magnetic part between the non-magnetic part and the oscillator is greater than or equal to a thickness of the write gap and less than or equal to two times the thickness of the write gap, wherein the thickness of the magnetic part and the thickness of the write gap are each measured in a direction parallel to the track moving direction.

3. The magnetic recording head according to claim 1, wherein a thickness of the non-magnetic part is no more than about three times a thickness of the magnetic part and no less than about half the thickness of the magnetic part, wherein the thickness of the non-magnetic part and the thickness of the magnetic part are measured in a direction parallel to the track moving direction.

4. The magnetic recording head according to claim 1, wherein the non-magnetic part includes non-magnetic members that extend to the write gap and are configured to magnetically separate a region in the trailing shield proximate the write gap.

5. The magnetic recording head according to claim 1, wherein the non-magnetic part is disposed in the trailing shield so that a portion of the magnetic part is disposed between the non-magnetic part and an air bearing surface of the recording head to magnetically separate a region of the trailing shield that is separated from the air bearing surface of the recording head.

6. The magnetic recording head according to claim 1, wherein the non-magnetic part is configured with an inclination at a non-normal angle to an air bearing surface of the recording head, a portion of the non-magnetic part that forms part of the air bearing surface of the recording head being disposed closer to the write gap than other portions of the non-magnetic part.

7. The magnetic recording head according to claim 1, wherein the magnetic part is configured with a thicker portion adjacent an air bearing surface of the recording head and a thinner portion distal from the air bearing surface of the recording head.

8. The magnetic recording head according to claim 1, wherein a surface of the magnetic part that forms a side of the write gap is configured with an inclination at a non-normal angle to an air bearing surface of the recording head, a portion of the magnetic part that forms part of the air bearing surface of the recording head being disposed closer to the write gap than other portions of the magnetic part.

9. The magnetic recording head according to claim 1, further comprising a side shield disposed on both sides of the main magnetic pole with respect to the track width direction that are physically separated from the main magnetic pole and connected to the trailing shield.

10. The magnetic recording head according to claim 9, further comprising: a leading shield disposed on a leading side of the main magnetic pole that is physically separated from the main magnetic pole and connected to the side shield.

11. A magnetic recording head, comprising:
a main magnetic pole that generates a recording magnetic field in a direction perpendicular to a recording layer of a recording medium;
a trailing shield that is disposed on a trailing side of the main magnetic pole, formed of magnetic material, and includes a non-magnetic portion that is formed of non-magnetic material; and
a write gap interposed between the main magnetic pole and the trailing shield and having a trailing surface defined by a leading surface of the trailing shield,
wherein:
the non-magnetic portion of the trailing shield is disposed a predetermined distance from the leading surface;
the predetermined distance is greater than or equal to a thickness of the write gap and less than or equal to two times the thickness of the write gap; and
the thickness of the predetermined distance and the thickness of the write gap are each measured in a direction parallel to the track moving direction.

12. A magnetic recording head, comprising:
a main magnetic pole that generates a recording magnetic field in a direction perpendicular to a recording layer of a recording medium;
a trailing shield that is disposed on a trailing side of the main magnetic pole, formed of magnetic material, and includes a non-magnetic portion that is formed of non-magnetic material; and
a write gap interposed between the main magnetic pole and the trailing shield and having a trailing surface defined by a leading surface of the trailing shield,
wherein:
the non-magnetic portion of the trailing shield is disposed a predetermined distance from the leading surface;
a thickness of the non-magnetic portion is no more than about three times the predetermined distance and no less than about half the predetermined distance; and
the thickness of the non-magnetic portion and the predetermined distance are measured in a direction parallel to the track moving direction.

13. A disk device, comprising:
a recording medium that includes a magnetic recording layer having magnetic anisotropy in a direction perpendicular to a medium surface;
a driving part that rotates the recording medium; and
a magnetic recording head comprising:
a main magnetic pole that generates a recording magnetic field in a direction perpendicular to a recording layer of a recording medium;
a trailing shield disposed on a trailing side of the main magnetic pole with a write gap interposed therebetween; and a high frequency oscillator that is provided between the main magnetic pole and the trailing shield in the write gap, wherein the trailing shield has a non-magnetic part and a magnetic part that is between the non-magnetic part and the oscillator that borders the write gap within a plane including track width direction centers of the main magnetic pole and the high frequency oscillator and being perpendicular to the recording layer of the recording medium, a film thickness of the non-magnetic part along a track moving direction is substantially equivalent to or more than a half of a distance from the gap side end surface to the non-magnetic part.

* * * * *